United States Patent [19]
Alcock et al.

[11] 3,897,220
[45] July 29, 1975

[54] CATALYTIC REACTORS

[75] Inventors: Leslie Alcock, Bexleyheath; James Ford, Northfleet, both of England

[73] Assignee: The British Petroleum Company, Limited, London, England

[22] Filed: Dec. 27, 1973

[21] Appl. No.: 428,753

[30] Foreign Application Priority Data
Jan. 23, 1973  United Kingdom................. 3336/73

[52] U.S. Cl............................... 23/288 R; 222/189
[51] Int. Cl............................................... B01j 9/04
[58] Field of Search....... 23/288 R, 288 E; 222/189; 137/549; 210/359, 291, 292, 293; 221/209; 214/17 A

[56] References Cited
UNITED STATES PATENTS
2,683,654  7/1954  Bergman........................... 23/288 R
2,808,319  10/1957  Huff.............................. 23/288 R X FOREIGN PATENTS OR APPLICATIONS
1,118,436  7/1968  United Kingdom

*Primary Examiner*—Joseph Scovronek
*Assistant Examiner*—Michael S. Marcus
*Attorney, Agent, or Firm*—Morgan, Finnegan, Pine, Foley & Lee

[57] ABSTRACT

A grid system for a catalytic reactor allowing catalyst to be discharged on shut down through the normal product outlet comprises a cylindrical or rectangular grid covering the outlet open at at least the outlet end, a shield adjacent the grid into which the grid can fit and means for moving the grid into and out of the shield and an extension of the grid into the outlet to position it and guide it when moved. The means for moving the grid is preferably external to the reactor and may be a rod passing through the outlet into contact with the grid or its extension. The grid system is particularly suitable for large reactors requiring relatively frequent catalyst replacement, eg. residue desulphurisation reactors.

3 Claims, 2 Drawing Figures

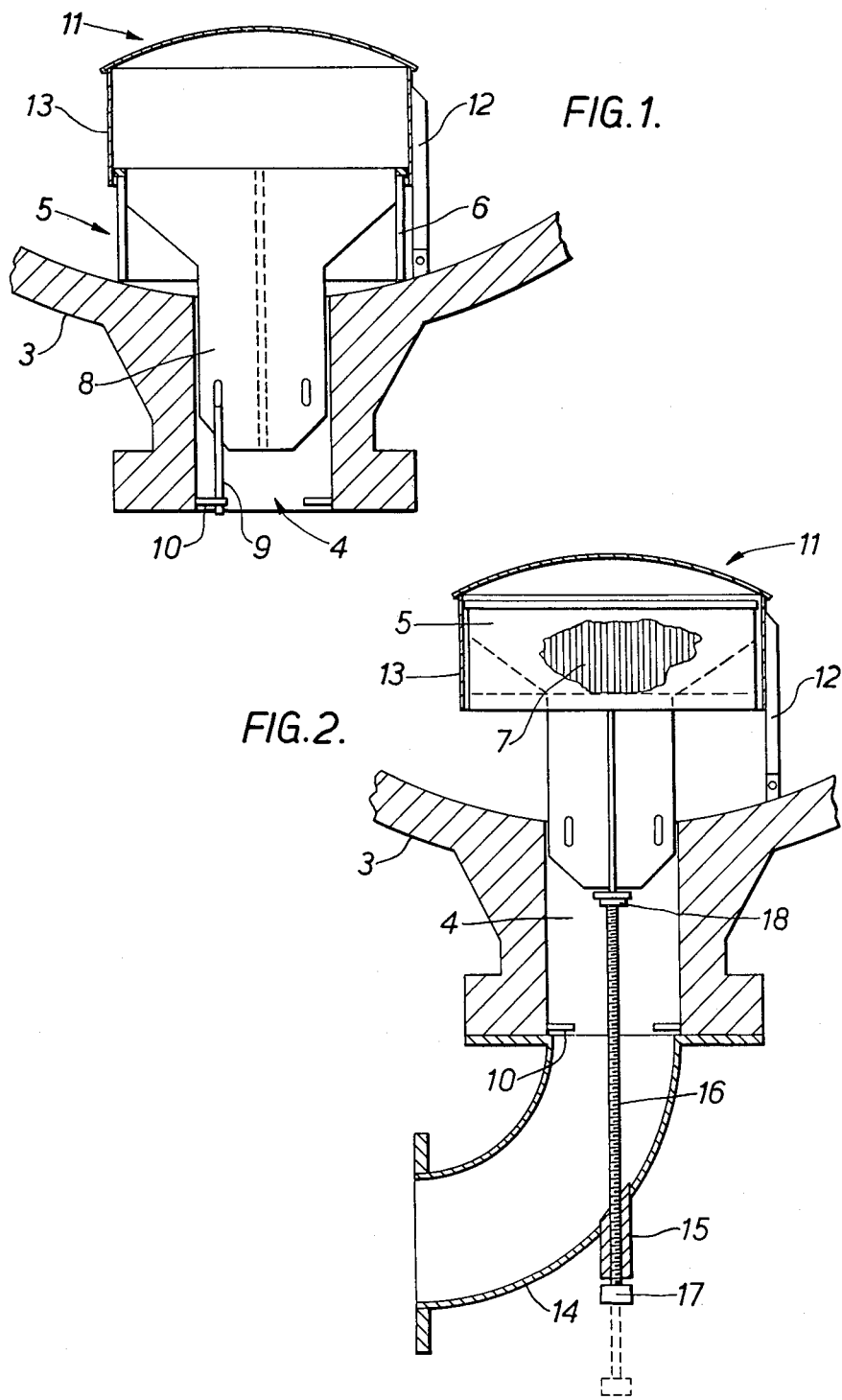

CATALYTIC REACTORS

This invention relates to catalytic reactors and particularly to the discharge of catalyst from fixed bed catalytic reactors.

In many reactions using fixed beds of catalyst, the catalyst has a long ultimate life of several years. Rapid discharge of spent catalyst from the reactor and rapid reloading with fresh catalyst is not important in such circumstances because overall time efficiency is high and catalyst discharge and replacement can be timed to coincide with a full and lengthy mechanical overhaul. Reactors for such reactions usually have a relatively small diameter catalyst discharge pipe at the base separate from the main product outlet pipe.

With reactions that involve fairly frequent catalyst replacement e.g. at least once a year, it is important to keep "down time" to a minimum and hence rapid catalyst discharge becomes important. One solution would be to increase the diameter of the normal, separate catalyst discharge pipe, but this would involve an additional large size nozzle in the vessel bottom posing additional stress problems.

The present invention solves the problem by using the same outlet pipe for reactor products and catalyst discharge.

The concept of using the product outlet pipe for catalyst discharge has been previously proposed. Thus U.S. Pat. No. 2,808,319 has a fixed cylindrical grid above the product outlet with an end plate removable from outside the reactor so that catalyst can be discharged through the cylindrical grid into the outlet. With this device, catalyst can be discharged without disturbing the ceramic balls in the base of the reactor, but the rate of discharge is low.

Movable grids have also been proposed. In U.K. Pat. No. 1118436 for example a double reactor has an inner cylindrical section and a surrounding annular section with a cylindrical grid at the base of the inner section. This grid can be hoisted upwards to allow discharge of catalyst from the annular section into an outlet below the grid.

Besides allowing rapid catalyst discharge for the reasons given above, any movable grid system for modern reactors has to be robust, because these reactors may be large and may contain tens if not hundred of tons of catalyst. At the same time it has to be simple and easily moved against this weight of catalyst.

According to the present invention a grid system for a catalytic reactor outlet comprises a cylindrical or rectangular grid covering the outlet and open at at least the end nearest the outlet, a shield adjacent the grid into which the grid can fit, an extension of the grid into the outlet to position the grid and means for moving the grid into and out of the shield.

The present invention includes a catalytic reactor containing a grid system as described above.

In essence therefore the present invention adapts the grid covering the reactor product outlet which is normally fixed and makes it movable so that when the reactor is shut down for discharge of catalyst, the grid can be moved away from the outlet into the shield thereby allowing the catalyst to be discharged through the outlet.

The grid system is particularly suitable for down flow reactors with a product outlet at the base, the catalyst being then dischargeable by gravity.

The cylindrical or rectangular grid should, as previously stated, be open at the end nearest the outlet and is preferably open also at the other end nearest the shield.

Preferably the width of the grid is greater than that of the product outlet so that it sits on and is supported by the base of the reactor. The extension of the grid into the outlet may be one or more fins, for example two fins at right angles giving a cruciform cross section. These fins position the grid above the outlet and also help to guide it when it is moved. If desired, removable bolts can be used to bolt the fins to flanges on the wall of the outlet and further assist in holding the grid rigid when the reactor is in use.

The shield is required to keep a space close to the grid free of catalyst particles, thereby allowing the grid to be moved easily, even if the reactor contains many tons of catalyst. It is preferably imperforate, though it may be perforated provided the holes are small enough to prevent catalyst particles entering the space it encloses. To form a proper shield for the grid into which the grid can move, the shield should clearly be open at the end nearest the grid, and closed at the other end and it is preferably also of cylindrical or rectangular shape. The closed end may be domed if desired. The shield is preferably only of slightly larger dimensions than the grid to allow a snug fit. The wall or walls of the shield nearest the grid should be at least contiguous with the grid to ensure that no catalyst particles get into the space enclosed by the shield and they preferably overlap slightly with the grid in which case the end of the grid nearest the shield can also be open. The overlaps may have packing to ensure a tight fit of the shield over the grid. The shield can be fixed in the reactor by any convenient means e.g. struts.

The means for moving the grid is preferably external to the reactor and may be a rod in the outlet which contacts the grid or its extension. The means can, if desired, be fixed to the grid or its extension and be present partly within the reactor and/or outlet during the normal operation, with only a portion external to the reactor. This system requires, however, a gas-tight passage in the wall of the reactor, the outlet, or outlet pipe.

Since at some point a separate collecting system will be required for discharged catalyst, it is preferred to have a separate catalyst discharge pipe which can be connected to the reactor outlet by removing the product outlet pipe. This discharge pipe can then conveniently include the means for moving the grid, for example a rod which can be moved by for example a screw into contact with the grid or its extension. If the rod is moved by screwing it preferably has a freely rotatable plate at the end contacting the grid or its extension to prevent rotation of the grid.

The invention is illustrated by the accompanying drawings in which:

FIG. 1 is a cross-section of the base of a reactor showing a grid covering a reactor outlet, and FIG. 2 is the same cross-section showing the grid in the position for catalyst discharge.

In FIG. 1 the reactor has a wall 3, and a product outlet 4. A cylindrical grid 5, open at both ends is formed of bars 6 covered with a perforated (slotted) sheet 7 (FIG. 2), the slots being smaller than the catalyst particles (not shown) in the reactor. The grid 5 rests on the reactor base 3 to cover the outlet pipe 4 and is positioned by fins 8 which, in plan, form a cross. Fins 8 are fixed to the grid 5 at their upper broadened end and extend down into the oulet 4 at their narrower end. The grid and fins are held by bolts, one of which is shown at 9, passing through brackets 10 in the outlet.

Shield 11 above the grid is fixed in the reactor by supports, one of which is shown at 12. Shield 11 is also cylindrical with a domed roof. The lower end of wall 13 of the shield overlaps with upper end of the grid, the space between the wall and grid being packed with asbestos rope (not shown).

It will be apparent that in normal operation catalyst particles are prevented from entering the outlet or the space enclosed by the shield. Fluid products can however pass through the grid and are removed through a product outlet pipe (not shown) bolted to the bottom of the outlet 4.

FIG. 2 shows the grid in the raised position. Additional features of this figure are a catalyst discharge pipe 14 bolted to the outlet 4. A nut 15 in the wall of pipe 14 has a screw threaded rod 16 passing through it. The rod has a knob 17 at the bottom and a freely rotatable plate 18 at the top.

When the reactor is shut down for catalyst discharge the product outlet pipe is unbolted from outlet 4 and the bolts 9 holding the grid 5 and fins 8 are removed. Catalyst discharge pipe 14 which can be made of relatively thin material is then bolted onto the outlet 4, and rod 16 rotated in nut 15 to raise it, and hence fins 8 and grid 5 into the space enclosed by shield 11. The fact that plate 18 at the top of rod 16 is freely rotatable ensures that fins 8 and grid 5 do not rotate with the rod 16. The fact that the grid 5 is open at both ends ensures that any gas in the space enclosed by the shield can escape and cannot resist the movement of the grid.

Catalyst in the reactor can thus pass from the reactor through the outlet 4 and pipe 14 by gravity, assisted by suction if required.

The present invention can be used in reactors for any suitable reaction, but, as previously stated, it is particularly useful for reactions where catalyst discharge and replacement is required at intervals of 1 year or less. Thus it is particularly suitable for reactions involving the catalytic treatment of petroleum fractions containing at least a proportion of material boiling above 550°C. more particularly fractions containing at least 50 percent volume of material boiling above 550°C. Such fractions normally contain organo-metallic complexes and asphalt which lay down deposits on the catalyst, which are not removable by conventional regeneration techniques. Thus the present invention may be used with reactors for the desulphurisation or hydrocracking of atmospheric residues boiling above 350°C, crude oils, or possibly, vacuum residues boiling above 350°C. Such reactions may conveniently be operated under the following ranges of conditions.

|  |  | Broad range | Preferred range | |
|---|---|---|---|---|
|  |  |  | for Desulphurisation | for Hydrocracking |
| Temperature | °C | 300 – 450 | 320 – 430 | 350 – 450 |
| Pressure | bars gauge | 35 – 210 | 35 – 170 | 70 – 210 |
| Space velocity | v/v/hr | 0.2 – 5 | 0.5 – 3.0 | 0.5 – 3.0 |
| Hydrogen treating rate | m³/m³ | 300 – 3600 | 360 – 1800 | 720 – 3600 |

It is estimated that, using the movable grid of the present invention, catalyst discharge from a reactor could be carried out in one-fifth of the time taken using a conventional separate discharge nozzle.

We claim:

1. A grid system for a catalytic reactor outlet comprising cylindrical or rectangular shaped grid adapted to seal the outlet to prevent the passage of catalyst and open at at least the end thereof nearest the outlet; a shield located adjacent the grid said shield being adapted and arranged to receive said grid therein and keep the space above and adjacent the grid free of catalyst thereby to allow the grid to be moved easily; said grid having an extension extending into the outlet to position the grid in coaxial alignment with said outlet; and means located in said outlet for moving the grid from the seal position into the shield to permit the catalyst to be discharged through the outlet.

2. A grid system for a catalytic reactor outlet as claimed in claim 1 wherein the extension of the grid is a fin.

3. A grid system for a catalytic reactor outlet as claimed in claim 1 wherein the end of the shield nearest the grid overlaps with the grid.

* * * * *